Patented Sept. 28, 1937

2,094,311

UNITED STATES PATENT OFFICE 2,094,311

1:4:5 TRIBENZOYLAMINO-8-HYDROXY-ANTHRAQUINONES

Max Utzinger and Max Bommer, Riehen, near Basel, Switzerland, assignors to Society of Chemical Industry in Basle, Basel, Switzerland No Drawing. Application May 29, 1936, Serial No. 82,674. In Switzerland June 19, 1935

2 Claims. (Cl. 260—59)

The 1:4:5-tribenzoylamino-8-hydroxyanthraquinones are valuable dyestuffs; they are applicable for dyeing and printing vegetable fibres, for instance cotton and artificial silk from regenerated cellulose or as pigments, for example in lithographic printing, or for coloring lacquers and plastic masses.

The following examples illustrate the invention, the parts being by weight:—

Example 1

20 parts of 1:4:5-triamino-8-hydroxyanthraquinone are suspended in 400 parts of nitrobenzene and the suspension is heated whilst stirring to 150–160° C. At this temperature 33 parts of benzoyl chloride are added by drops, whereupon 1:4:5-tribenzoylamino-8-hydroxyanthraquinone soon begins to separate in the form of small laminae having a mat lustre. After stirring for some time the mass is allowed to cool and filtered and the solid matter is washed with some nitrobenzene and then with alcohol and finally dried.

The 1:4:5-tribenzoylamino-8-hydroanthraquinone is a dark brown-violet powder which advantageously after reprecipitation from sulfuric acid of about 90 per cent. strength dyes cotton pure blue tints of very good properties of fastness.

The same dyestuff is obtained when benzoyl bromide or benzoic anhydride is used instead of benzoyl chloride. Similar dyestuffs are obtained by substituting ortho-, meta- or para-chlorbenzoyl chloride for the benzoyl chloride.

Example 2

10 parts of 1:4:5-triamino-8-hydroxyanthraquinone are dissolved in 200 parts of hot nitrobenzene. While stirring the solution at 160° C. 20 parts of anisoyl chloride dissolved in 20 parts of nitrobenzene are added by drops. After stirring for 1–2 hours at about 160° C. the mixture is allowed to cool, whereupon 1:4:5-trianisoylamino-8-hydroxyanthraquinone separates in the form of small prisms; it is filtered, washed with nitrobenzene and alcohol and dried.

It is a dark violet powder which can be vatted with difficulty; when used for lithographic printing it yields a reddish-blue print.

Example 3

28.6 parts of 1-amino-4:5-dinitro-8-hydroxyanthraquinone are suspended in 300 parts of nitrobenzene and the suspension at 190–200° C. is mixed with 13 parts of benzoyl chloride. After the reaction has proceeded for a short time the mass is allowed to cool and filtered; the solid matter is washed with nitrobenzene and alcohol and dried, when it has the form of yellow laminae which are 1-benzoylamino-4:5-dinitro-8-hydroxyanthraquinone. These crystals are finely pulverized, for example by grinding them with water in a ball mill. The paste thus obtained is mixed with 60 parts by volume of sodium hydrosulfide solution of 21 per cent. strength and the mixture is gradually heated to boiling. In this manner the corresponding hydroxylamine derivate is first formed by reduction of the two nitro groups of the 1-benzoylamino-4:5-dinitro-8-hydroxyanthraquinone and then this soluble and blue-green derivative is further reduced to the blue 1-benzoylamino-4:5-diamino-8-hydroxyanthraquinone which is insoluble in water.

9.2 parts of this 1-benzoylamino-4:5-diamino-8-hydroxyanthraquinone isolated by filtration, washing with water and drying, are dissolved whilst stirring in 200 parts of nitrobenzene and the solution is mixed at 175° C. with 9 parts of anisoyl chloride. After stirring for a short time the whole is allowed to cool and filtered; the solid matter is washed with nitrobenzene and alcohol and dried.

The 1-benzoylamino-4:5-dianisoylamino-8-hydroxyanthraquinone thus obtained forms lustrous dark reddish-blue laminae which may be vatted with some difficulty and yield in lithographic printing blue prints.

A dyestuff having similar properties is obtained if in the foregoing example anisoyl chloride is substituted for the benzoyl chloride and para-chlorbenzoyl chloride for the anisoyl chloride.

The 1-amino-4:5-dinitro-8-hydroxyanthraquinone used as the parent material in this example may be made as follows:—

1-amino-8-chloranthraquinone is converted by treatment with hot methyl alcoholic caustic alkali into 1-amino-8-methoxyanthraquinone, which is then converted into 1-oxamino-8-methoxyanthraquinone by fusion with oxalic acid. By dissolving the latter in sulfuric acid and nitrating cold there is obtained 1-oxamino-4:5-dinitro-8-methoxyanthraquinone from which first the oxalic acid residue is removed by treatment with an alkaline agent, for instance sodium carbonate, and then the methoxy-group by saponification by means of hot sulfuric acid.

What we claim is:—

1. 1:4:5 - triacylamino - 8 - hydroxyanthraquinones of the general formula

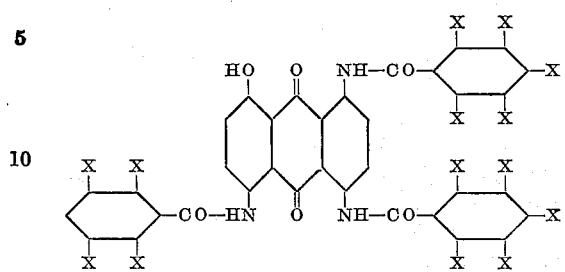

wherein the X's are members of the group of substituents consisting of hydrogen, methyl, methoxy, ethoxy and halogen, which products are violet to blue powders yielding blue tints of very good fastness properties.

2. 1:4:5 - tribenzoylamino - 8 - hydroxyanthraquinone of the formula

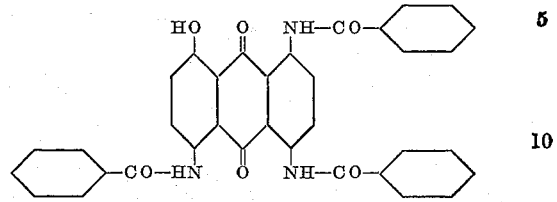

which product is a dark brown-violet powder dyeing cotton from the vat pure blue tints of very good fastness properties.

MAX UTZINGER.
MAX BOMMER.